(12) United States Patent  
Eyuboglu et al.

(10) Patent No.: US 9,019,935 B2
(45) Date of Patent: Apr. 28, 2015

(54) RADIO NETWORK CONTROL (75) Inventors: M. Vedat Eyuboglu, Concord, MA (US); Arthur J. Barabell, Sudbury, MA (US); Sanjay Cherian, Brookline, NH (US)

(73) Assignee: Ericsson EVDO Inc., Dover, DE (US)

( * ) Notice: Subject to any disclaimer, the term of this patent is extended or adjusted under 35 U.S.C. 154(b) by 65 days.

(21) Appl. No.: 13/430,422

(22) Filed: Mar. 26, 2012

(65) Prior Publication Data

US 2012/0243476 A1 Sep. 27, 2012

Related U.S. Application Data (63) Continuation of application No. 09/891,103, filed on Jun. 25, 2001, now Pat. No. 8,160,020.

(51) Int. Cl.
*H04W 4/00* (2009.01)
*H04J 3/06* (2006.01)
*H04L 29/12* (2006.01)
*H04W 36/00* (2009.01)
*H04W 80/04* (2009.01)
*H04W 40/02* (2009.01)

(52) U.S. Cl.
CPC ......... *H04L 29/12103* (2013.01); *H04J 3/0682* (2013.01); *H04W 80/04* (2013.01); *H04L 61/1535* (2013.01); *H04W 36/0011* (2013.01); *H04W 40/02* (2013.01)

(58) Field of Classification Search
USPC ............... 370/328, 331, 338, 401; 455/422.1, 455/432, 1, 436–440, 442, 435.1
See application file for complete search history.

(56) References Cited

U.S. PATENT DOCUMENTS

| | | | |
|---|---|---|---|
| 5,128,938 A | 7/1992 | Borras | |
| 5,239,675 A | 8/1993 | Dudczak | |
| 5,377,224 A | 12/1994 | Hudson | |
| 5,574,996 A | 11/1996 | Raith | |
| 5,754,945 A | 5/1998 | Lin et al. | |
| 5,790,528 A | 8/1998 | Muszynski | |
| 5,815,813 A | 9/1998 | Faruque | |
| 5,828,661 A | 10/1998 | Weaver et al. | |
| 5,852,630 A | 12/1998 | Langberg et al. | |

(Continued)

FOREIGN PATENT DOCUMENTS

| | | |
|---|---|---|
| AU | 1998/72855 | 12/1998 |
| AU | 1998/84574 | 2/1999 |

(Continued)

OTHER PUBLICATIONS

European Search Report from European Application No. 06836082.5 mailed Apr. 26, 2013 (80 pages).

(Continued)

*Primary Examiner* — Alvin Zhu (57) ABSTRACT

In connection with a mobile wireless subnetwork having multiple radio network controllers and multiple radio nodes, a session established for an access terminal is associated with a serving radio network controller. The association is maintained as the access terminal moves from the coverage area of one radio node to the coverage area of another radio node within the same subnetwork. Access channel packets are routed from an access terminal having an existing session to the serving radio network controller by determining the IP address of the serving radio network controller using a session identifier.

18 Claims, 4 Drawing Sheets

(56) References Cited

U.S. PATENT DOCUMENTS

| | | |
|---|---|---|
| 5,857,154 A | 1/1999 | Laborde et al. |
| 5,884,177 A | 3/1999 | Hanley |
| 5,930,714 A | 7/1999 | Abu-Amara et al. |
| 5,937,345 A | 8/1999 | McGowan et al. |
| 5,940,762 A | 8/1999 | Lee et al. |
| 5,960,349 A | 9/1999 | Chheda |
| 5,974,318 A | 10/1999 | Satarasinghe |
| 5,983,282 A | 11/1999 | Yucebay |
| 5,991,635 A | 11/1999 | Dent et al. |
| 6,011,970 A | 1/2000 | McCarthy |
| 6,014,564 A | 1/2000 | Donis et al. |
| 6,016,429 A | 1/2000 | Khafizov et al. |
| 6,023,625 A | 2/2000 | Myers |
| 6,032,033 A | 2/2000 | Morris et al. |
| 6,047,186 A | 4/2000 | Yu et al. |
| 6,049,715 A | 4/2000 | Willhoff et al. |
| 6,052,594 A | 4/2000 | Chuang et al. |
| 6,061,560 A | 5/2000 | Saboorian et al. |
| 6,069,871 A | 5/2000 | Sharma et al. |
| 6,091,953 A | 7/2000 | Ho et al. |
| 6,101,394 A | 8/2000 | Illidge |
| 6,111,857 A | 8/2000 | Soliman et al. |
| 6,112,089 A | 8/2000 | Satarasinghe |
| 6,119,024 A | 9/2000 | Takayama |
| 6,122,513 A | 9/2000 | Bassirat |
| 6,151,512 A | 11/2000 | Chheda et al. |
| 6,167,036 A | 12/2000 | Beven |
| 6,178,328 B1 | 1/2001 | Tang et al. |
| 6,192,246 B1 | 2/2001 | Satarasinghe |
| 6,198,719 B1 | 3/2001 | Faruque et al. |
| 6,198,910 B1 | 3/2001 | Hanley |
| 6,208,615 B1 | 3/2001 | Faruque et al. |
| 6,219,539 B1 | 4/2001 | Basu et al. |
| 6,223,047 B1 | 4/2001 | Ericsson |
| 6,233,247 B1 | 5/2001 | Alami et al. |
| 6,246,674 B1 | 6/2001 | Feuerstein et al. |
| 6,252,862 B1 | 6/2001 | Sauer et al. |
| 6,256,300 B1 | 7/2001 | Ahmed et al. |
| 6,266,529 B1 | 7/2001 | Chheda |
| 6,272,148 B1 | 8/2001 | Takagi et al. |
| 6,285,875 B1 | 9/2001 | Alajoki et al. |
| 6,289,220 B1 | 9/2001 | Spear |
| 6,320,898 B1 | 11/2001 | Newson et al. |
| 6,345,185 B1 | 2/2002 | Yoon et al. |
| 6,366,961 B1 | 4/2002 | Subbiah et al. |
| 6,370,357 B1 | 4/2002 | Xiao et al. |
| 6,370,381 B1 | 4/2002 | Minnick et al. |
| 6,393,482 B1 | 5/2002 | Rai et al. |
| 6,400,712 B1 | 6/2002 | Phillips |
| 6,404,754 B1 | 6/2002 | Lim |
| 6,408,182 B1 | 6/2002 | Davidson et al. |
| 6,418,306 B1 | 7/2002 | McConnell |
| 6,424,834 B1 | 7/2002 | Chang et al. |
| 6,430,168 B1 | 8/2002 | Djurkovic et al. |
| 6,438,370 B1 | 8/2002 | Einola et al. |
| 6,438,376 B1 | 8/2002 | Elliott et al. |
| 6,438,377 B1 | 8/2002 | Savolainen |
| 6,445,922 B1 | 9/2002 | Hiller et al. |
| 6,459,696 B1 | 10/2002 | Carpenter et al. |
| 6,473,399 B1 | 10/2002 | Johansson et al. |
| 6,477,159 B1 | 11/2002 | Yahagi |
| 6,480,476 B1 | 11/2002 | Willars |
| 6,480,718 B1 | 11/2002 | Tse |
| 6,507,741 B1 | 1/2003 | Bassirat |
| 6,522,885 B1 | 2/2003 | Tang et al. |
| 6,539,030 B1 | 3/2003 | Bender et al. |
| 6,542,481 B2 | 4/2003 | Foore et al. |
| 6,542,752 B1 | 4/2003 | Illidge |
| 6,545,984 B1 | 4/2003 | Simmons |
| 6,560,453 B1 | 5/2003 | Henry et al. |
| 6,590,879 B1 | 7/2003 | Huang et al. |
| 6,611,695 B1 | 8/2003 | Periyalwar |
| 6,618,585 B1 | 9/2003 | Robinson et al. |
| 6,621,811 B1 | 9/2003 | Chang et al. |
| 6,628,637 B1 | 9/2003 | Li et al. |
| 6,651,105 B1 | 11/2003 | Bhagwat et al. |
| 6,687,237 B1 | 2/2004 | Lee et al. |
| 6,701,148 B1 | 3/2004 | Carter et al. |
| 6,701,149 B1 | 3/2004 | Bagchi et al. |
| 6,711,144 B1 | 3/2004 | Kim et al. |
| 6,731,618 B1 | 5/2004 | Chung et al. |
| 6,738,625 B1 | 5/2004 | Oom et al. |
| 6,741,862 B2 | 5/2004 | Chung et al. |
| 6,754,191 B1 | 6/2004 | Paranchych et al. |
| 6,757,319 B1 | 6/2004 | Parsa et al. |
| 6,768,903 B2 | 7/2004 | Fauconnier et al. |
| 6,781,999 B2 | 8/2004 | Eyuboglu et al. |
| 6,813,498 B1 | 11/2004 | Durga et al. |
| 6,826,402 B1 | 11/2004 | Tran |
| 6,834,050 B1 | 12/2004 | Madour et al. |
| 6,842,630 B2 | 1/2005 | Periyalwar |
| 6,847,821 B1 | 1/2005 | Lewis et al. |
| 6,877,104 B1 | 4/2005 | Shimono |
| 6,909,887 B2 | 6/2005 | Fauconnier et al. |
| 6,944,452 B2 | 9/2005 | Coskun et al. |
| 6,975,869 B1 | 12/2005 | Billon |
| 6,996,056 B2 | 2/2006 | Chheda et al. |
| 6,999,784 B1 | 2/2006 | Choi et al. |
| 7,035,636 B1 | 4/2006 | Lim et al. |
| 7,042,858 B1 | 5/2006 | Jia et al. |
| 7,047,009 B2 | 5/2006 | Laroia et al. |
| 7,072,663 B2 | 7/2006 | Ramos et al. |
| 7,079,511 B2 | 7/2006 | Abrol et al. |
| 7,085,251 B2 | 8/2006 | Rezaiifar |
| 7,110,785 B1 | 9/2006 | Paranchych et al. |
| 7,130,626 B2 | 10/2006 | Bender et al. |
| 7,130,668 B2 | 10/2006 | Chang et al. |
| 7,139,575 B1 | 11/2006 | Chen et al. |
| 7,162,247 B2 | 1/2007 | Baba et al. |
| 7,170,871 B2 | 1/2007 | Eyuboglu et al. |
| 7,177,650 B1 | 2/2007 | Reiger et al. |
| 7,200,391 B2 | 4/2007 | Chung et al. |
| 7,212,822 B1 | 5/2007 | Vicharelli |
| 7,236,764 B2 | 6/2007 | Zhang et al. |
| 7,242,958 B2 | 7/2007 | Chung et al. |
| 7,251,491 B2 | 7/2007 | Jha |
| 7,277,446 B1 | 10/2007 | Abi-Nassif et al. |
| 7,298,327 B2 | 11/2007 | Dupray et al. |
| 7,299,168 B2 | 11/2007 | Rappaport et al. |
| 7,299,278 B2 | 11/2007 | Ch'ng |
| 7,349,699 B1 | 3/2008 | Kelly et al. |
| 7,398,087 B1 | 7/2008 | McConnell et al. |
| 7,408,887 B2 | 8/2008 | Sengupta et al. |
| 7,408,901 B1 | 8/2008 | Narayanabhatla |
| 7,411,996 B2 | 8/2008 | Kim et al. |
| 7,453,912 B2 | 11/2008 | Laroia et al. |
| 7,457,265 B2 | 11/2008 | Julka et al. |
| 7,486,696 B2 | 2/2009 | Garg et al. |
| 7,512,110 B2 | 3/2009 | Sayeedi et al. |
| 7,546,124 B1 | 6/2009 | Tenneti et al. |
| 7,751,835 B2 | 7/2010 | Sharma et al. |
| 7,751,858 B2 | 7/2010 | Chou |
| 8,085,696 B2 | 12/2011 | Garg et al. |
| 8,094,630 B2 | 1/2012 | Garg et al. |
| 8,145,221 B2 | 3/2012 | Garg et al. |
| 8,160,020 B2 | 4/2012 | Eyuboglu et al. |
| 8,195,187 B2 | 6/2012 | Eyuboglu et al. |
| 2002/0025820 A1 | 2/2002 | Fauconnier et al. |
| 2002/0031107 A1 | 3/2002 | Li et al. |
| 2002/0032034 A1 | 3/2002 | Tiedemann et al. |
| 2002/0035699 A1 | 3/2002 | Crosbie |
| 2002/0068570 A1 | 6/2002 | Abrol et al. |
| 2002/0082018 A1 | 6/2002 | Coskun et al. |
| 2002/0085719 A1 | 7/2002 | Crosbie |
| 2002/0102976 A1 | 8/2002 | Newbury et al. |
| 2002/0136226 A1 | 9/2002 | Christoffel et al. |
| 2002/0196749 A1 | 12/2002 | Eyuboglu et al. |
| 2003/0003913 A1 | 1/2003 | Chen et al. |
| 2003/0026240 A1 | 2/2003 | Eyuboglu et al. |
| 2003/0031201 A1 | 2/2003 | Choi |
| 2003/0067970 A1 | 4/2003 | Kim et al. |
| 2003/0095513 A1 | 5/2003 | Woodmansee et al. |
| 2003/0100311 A1 | 5/2003 | Chung et al. |
| 2003/0114162 A1 | 6/2003 | Chheda et al. |

(56) References Cited

U.S. PATENT DOCUMENTS

| | | |
|---|---|---|
| 2003/0117948 A1 | 6/2003 | Ton et al. |
| 2003/0125039 A1 | 7/2003 | Lachtar et al. |
| 2003/0195016 A1 | 10/2003 | Periyalwar |
| 2004/0008649 A1 | 1/2004 | Wybenga et al. |
| 2004/0015607 A1 | 1/2004 | Bender et al. |
| 2004/0038700 A1 | 2/2004 | Gibbs |
| 2004/0068668 A1 | 4/2004 | Lor et al. |
| 2004/0081111 A1 | 4/2004 | Bae et al. |
| 2004/0179492 A1 | 9/2004 | Zhang et al. |
| 2004/0203771 A1 | 10/2004 | Chang et al. |
| 2004/0214574 A1 | 10/2004 | Eyuboglu et al. |
| 2004/0218556 A1 | 11/2004 | Son et al. |
| 2004/0224687 A1 | 11/2004 | Rajkotia |
| 2004/0266436 A1 | 12/2004 | Jaakkola et al. |
| 2005/0021616 A1 | 1/2005 | Rajahalm et al. |
| 2005/0053034 A1 | 3/2005 | Chiueh |
| 2005/0111429 A1 | 5/2005 | Kim et al. |
| 2005/0113117 A1 | 5/2005 | Bolin et al. |
| 2005/0124343 A1 | 6/2005 | Kubo |
| 2005/0148297 A1 | 7/2005 | Lu et al. |
| 2005/0181795 A1 | 8/2005 | Mark et al. |
| 2005/0207368 A1 | 9/2005 | Nam |
| 2005/0213555 A1 | 9/2005 | Eyuboglu et al. |
| 2005/0223097 A1 | 10/2005 | Ramsayer et al. |
| 2005/0233746 A1 | 10/2005 | Laroia et al. |
| 2005/0243749 A1 | 11/2005 | Mehrabanzad et al. |
| 2005/0245279 A1 | 11/2005 | Mehrabanzad et al. |
| 2006/0030323 A1 | 2/2006 | Ode et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0126554 A1 | 6/2006 | Motegi et al. |
| 2006/0126556 A1 | 6/2006 | Jiang et al. |
| 2006/0146751 A1 | 7/2006 | Obuchi et al. |
| 2006/0148460 A1 | 7/2006 | Mukherjee et al. |
| 2006/0159045 A1 | 7/2006 | Ananthaiyer et al. |
| 2006/0182063 A1 | 8/2006 | Jia et al. |
| 2006/0183497 A1 | 8/2006 | Paranchych et al. |
| 2006/0203766 A1 | 9/2006 | Kim et al. |
| 2006/0209760 A1 | 9/2006 | Saito et al. |
| 2006/0209882 A1 | 9/2006 | Han et al. |
| 2006/0240782 A1 | 10/2006 | Pollman et al. |
| 2006/0259628 A1 | 11/2006 | Vadlapudi et al. |
| 2006/0264218 A1 | 11/2006 | Zhang et al. |
| 2006/0291420 A1 | 12/2006 | Ng |
| 2006/0294214 A1 | 12/2006 | Chou |
| 2006/0294241 A1 | 12/2006 | Cherian et al. |
| 2007/0022396 A1 | 1/2007 | Attar et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0099632 A1 | 5/2007 | Choksi |
| 2007/0105527 A1 | 5/2007 | Nylander |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0153750 A1 | 7/2007 | Baglin et al. |
| 2007/0155329 A1 | 7/2007 | Mehrabanzad et al. |
| 2007/0160008 A1 | 7/2007 | Burgess |
| 2007/0197220 A1 | 8/2007 | Willey |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0009328 A1 | 1/2008 | Narasimha |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0070574 A1 | 3/2008 | Vikberg et al. |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0273493 A1 | 11/2008 | Fong et al. |
| 2008/0287130 A1 | 11/2008 | Laroia et al. |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0103494 A1 | 4/2009 | Jia et al. |
| 2009/0116445 A1 | 5/2009 | Samar et al. |
| 2009/0129334 A1 | 5/2009 | Fong et al. |
| 2009/0156218 A1 | 6/2009 | Garg et al. |
| 2009/0191878 A1 | 7/2009 | Hedqvist et al. |
| 2012/0243476 A1 | 9/2012 | Eyuboglu et al. |

FOREIGN PATENT DOCUMENTS

| | | |
|---|---|---|
| AU | 2001/21976 | 6/2001 |
| AU | 735575 | 7/2001 |
| AU | 2003/202721 | 10/2003 |
| CA | 2295922 | 3/2004 |
| CN | 1265253 | 8/2000 |
| CN | 1653844 | 10/2004 |
| CN | 101015224 A | 8/2007 |
| CN | 101015224 B | 5/2012 |
| EP | 625863 | 11/1994 |
| EP | 0904369 | 3/1999 |
| EP | 983694 | 3/2000 |
| EP | 983705 | 3/2000 |
| EP | 995278 | 4/2000 |
| EP | 995296 | 4/2000 |
| EP | 1005245 | 5/2000 |
| EP | 1011283 | 6/2000 |
| EP | 1014107 | 6/2000 |
| EP | 1397929 | 3/2004 |
| EP | 1491065 | 12/2004 |
| EP | 1751998 | 2/2007 |
| EP | 1896980 | 3/2008 |
| EP | 1897383 | 3/2008 |
| GB | 2447585 | 8/2008 |
| GB | 2452688 | 3/2009 |
| GB | 2447585 | 10/2010 |
| HK | 1101334 A | 10/2007 |
| JP | 2007-538476 | 12/2007 |
| JP | 2008-547329 | 12/2008 |
| JP | 2008-547358 | 12/2008 |
| JP | 5117188 B2 | 10/2012 |
| KR | 9833373 | 8/1998 |
| KR | 2004/046069 | 6/2004 |
| KR | 2004/089744 | 10/2004 |
| KR | 787289 | 12/2007 |
| MX | 1999/10613 | 3/2002 |
| WO | WO9748191 | 12/1997 |
| WO | WO 98/08353 | 2/1998 |
| WO | WO 98/09460 | 3/1998 |
| WO | WO98/53618 | 11/1998 |
| WO | WO98/53620 | 11/1998 |
| WO | WO99/03245 | 1/1999 |
| WO | WO99/04511 | 1/1999 |
| WO | WO00/60891 | 10/2000 |
| WO | WO01/45308 | 6/2001 |
| WO | WO01/86988 | 11/2001 |
| WO | WO02/071633 | 9/2002 |
| WO | WO02/071652 | 9/2002 |
| WO | WO03/001820 | 1/2003 |
| WO | WO03/009576 | 1/2003 |
| WO | WO 03/043364 | 5/2003 |
| WO | WO03/054721 | 7/2003 |

(56) References Cited

FOREIGN PATENT DOCUMENTS

| WO | WO03/081938 | 10/2003 |
|---|---|---|
| WO | WO2004/064434 | 7/2004 |
| WO | WO2005/012520 | 12/2005 |
| WO | WO2005/115026 | 12/2005 |
| WO | WO2006/081527 | 8/2006 |
| WO | WO2007/002659 | 1/2007 |
| WO | WO2007/028122 | 3/2007 |
| WO | WO2007/028252 | 3/2007 |
| WO | WO2007/044099 | 4/2007 |
| WO | WO2007/045101 | 4/2007 |
| WO | WO 2007/075446 | 7/2007 |
| WO | WO 2007/078766 | 7/2007 |
| WO | WO2007/078766 | 5/2011 |

OTHER PUBLICATIONS

Paul Bender, et al., "CDMA/HDR: A Bandwidth-Efficient High-Speed Wireless Data Service for Nomadic Users", IEEE Communications Magazine, Jul. 2000.
Paul Bender & Ramin Rezalifar, "Draft Baseline Text for the 1xEV-DO Upper Layers (excluding Physical Layer)", 3GPP2, Aug. 17, 2000.
3GPP2, "3GPP2 Access Network Interfaces Interoperability Specification 2, Release A," Jun. 2000.
TIA/EIA/TSB-115, "Wireless IP Architecture Based on IETF Protocols", Jun. 6, 2000.
3GPP2, "Wireless IP Network Standard", 3rd Generation Partnership Project 2 (3GPP2), Version 1.0.0, Jul. 14, 2000.
Goran Janevski, "IP-Based Mobile Wireless Access Network Architecture", Nortel Networks-MWIF Contribution, Draft dated Sep. 7, 2000.
International Search Report, Patent Cooperation Treaty, Oct. 26, 2006, 6 pages.
Written Opinion of the International Searching Authority, Patent Cooperation Treaty, Oct. 26, 2006, 8 pages.
International Search Report, Patent Cooperation Treaty, Apr. 26, 2007, 10 pages.
International Search Report, Patent Cooperation Treaty, Oct. 29, 2002, 5 pages.
*International Preliminary Report on Patentability* for Application No. PCT/US2005/017385, Dec. 7, 2006, 8 pages.
*International Preliminary Report on Patentability* for Application No. PCT/US2006/024958, Jan. 17, 2008, 7 pages.
*EP Examination Report* for Application No. 06785637.7, Feb. 6, 2008, 2 pages.
U.S. Appl No. 11/640,619, filed Dec. 18, 2006.
PCT application No. PCT/US2005/17385 filed on May 17, 2005, with Publication No. WO2005/115026.
U.S. Appl. No. 11/037,896, filed Jan. 18, 2005, and pending claims.
U.S. Appl. No. 11/167,785, filed Jun. 27, 2005, and pending claims.
PCT application No. PCT/US2006/24958 filed on Jun. 27, 2006, with Publication No. WO2007/002659.
U.S. Appl. No. 11/303,773, filed Dec. 16, 2005, and pending claims.
U.S. Appl. No. 11/305,286, filed Dec. 16, 2005.
PCT application No. PCT/US2006/47524 filed on Dec. 13, 2006, with Publication No. WO2007/078766.
U.S. Appl. No. 11/303,774, filed Dec. 16, 2005, and pending claims.
PCT application No. PCT/US2006/47963 filed on Dec. 15, 2006, with Publication No. WO2007/075446.
U.S. Appl. No. 11/955,644, filed Dec. 13, 2007.
U.S. Appl. No. 11/243,405, filed Oct. 4, 2005, and pending claims.
International Search Report and Written Opinion for PCT international application No. PCT/US2006/25018, mailed Jan. 29, 2008 (11 pages).
International Preliminary Report on Patentability for Application No. PCT/US2006/25018, Mar. 19, 2009 (8 pages).
International Preliminary Report on Patentability for PCT international application No. PCT/US2006/047963, mailed Dec. 11, 2008 (5 pages).
International Search Report and Written Opinion for PCT international application No. PCT/US2006/047963, mailed Sep. 26, 2008 (9 pages).
PCT application No. PCT/US2002/020380 filed on Jun. 25, 2002, with Publication No. WO2003/001820.
U.S. Appl. No. 11/166,893, filed Jun. 24, 2005.
PCT application No. PCT/US2006/025018 filed on Jun. 26, 2006, with Publication No. WO2007/044099.
U.S. Appl. No. 11/402,744, filed Apr. 12, 2006, and pending claims.
3rd Generation Partnership Project "3GPP2", cdma2000 High Rate Packet Data Interface Specification, C.S0024-A, version 4.0, Oct. 25, 2002.
3rd Generation Partnership Project "3GPP2", cdma2000 High Rate Packet Data Interface Specification, C.S0024-A, version 1.0, Mar. 2004.
3rd Generation Partnership Project "3GPP2", cdma2000 High Rate Packet Data Interface Specification, C.S0024-A, version 2.0, Jul. 2005.
3rd Generation Partnership Project "3GPP2", cdma2000 High Rate Packet Data Interface Specification, C.S0024-B, version 1.0, Apr. 2006.
Rashid Attar et al., "Evolution of cdma2000 Cellular Networks: Multicarrier EV-DO", IEEE Communications Magazine, Mar. 2006. pp. 46-53.
Chinese Office action of Chinese application No. 200580024230.0 mailed Mar. 15, 2009 (13 pages).
EP Examination Report for Application No. 05750705.5, Jan. 9, 2007, 2 pages.
Office action and response history of U.S. Appl. No. 10/848,597 to May 18, 2004.
Office action and response history of U.S. Appl. No. 11/166,893 to May 27, 2009.
Office action and response history of U.S. Appl. No. 11/037,896 to May 27, 2009.
Office action and response history of U.S. Appl. No. 11/167,785 to May 27, 2009.
Office action and response history of U.S. Appl. No. 11/243,405 to May 27, 2009.
Office action and response history of U.S. Appl. No. 11/303,773 to May 27, 2009.
Office action and response history of U.S. Appl. No. 11/305,286 to Jun. 1, 2009.
Office action and response history of U.S. Appl. No. 11/303,774 to May 27, 2009.
Office action and response history of U.S. Appl. No. 11/402,744 to May 27, 2009.
Office action and response history of U.S. Appl. No. 11/955,644 to May 27, 2009.
TIA/EIA/IS-2001, Interoperability Specification (IOS) for CDMA2000 Network Access Interfaces, Aug. 2001 (revised version of May 2000).
International Search Report and Written Opinion for PCT international application No. PCT/US2006/047524, mailed May 26, 2009 (13 pages).
Office action of U.S Appl. No. 11/303,774 dated Jun. 12, 2009.
Office action of U.S. Appl. No. 11/167,785 dated Jun. 22, 2009.
Office action of U.S. Appl. No. 11/243,405 dated Jun. 22, 2009.
Office action of U.S. Appl. No. 11/305,286 dated Jun. 1, 2009.
Office Action and response from European Patent Office for Application No. 06836082.5 mailed Jun. 18, 2009 and sent Jul. 21, 2009 (21 pages).
Chinese Office action response of Chinese application No. 200580024230.0 sent Jul. 22, 2009 (8 pages).
Office action and response history of U.S. Appl. No. 11/166,893 to Aug. 11, 2009.
Office action and response history of U.S. Appl. No. 11/955,644 to Aug. 11, 2009.
Office action and response history of U.S. Appl. No. 11/167,785 to Aug. 11, 2009.
Office action and response history of U.S. Appl. No. 11/243,405 to Aug. 11, 2009.
Office action and response history of U.S. Appl. No. 11/305,286 to Aug. 11, 2008.

(56) References Cited

OTHER PUBLICATIONS

Office action and response history of U.S. Appl. No. 11/303,774 to Aug. 13, 2009.
Office action and response history of U.S. Appl. No. 11/303,773 to Aug. 13, 2009.
Australian (AU) Examination Report for Application No. 2005426813, Jun. 4, 2009 (18 pages).
Office action and response history of U.S. Appl. No. 11/402,744 to Aug. 17, 2009.
Office action and response history of U.S. Appl. No. 11/486,545 to Aug. 26, 2009.
3rd Generation Partnership Project 2 "3GPP2", "cdma2000 High Rate Packet Data Interface Specification", C.S0024, version 2, Oct. 27, 2000 (441 pages).
3rd Generation Partnership Project 2 "3GPP2", "cdma2000 High Rate Packet Data Interface Specification", C.S0024-B, version 2, Mar. 2007 (1627 pages).
Library Search for Nortel and frequency handoff. Search results dated Aug. 28, 2009 (85 pages).
Office action and response history of U.S. Appl. No. 11/037,896 to Sep. 17, 2009.
Office action and response history of U.S. Appl. No. 11/303,774 to Sep. 17, 2009.
Office action and response history of U.S. Appl. No. 11/167,785 to Sep. 22, 2009.
Office action and response history of U.S. Appl. No. 11/243,405 to Nov. 9, 2009.
Office action and response history of U.S. Appl. No. 11/305,286 to Sep. 30, 2009.
Office action and response history of U.S. Appl. No. 11/640,619 to Nov. 9, 2009.
Office action and response history of U.S. Appl. No. 11/303,773 to Nov. 20, 2009.
Office action and response history of U.S. Appl. No. 11/402,744 to Nov. 30, 2009.
Chinese Office action of Chinese application No. 200580024230.0 mailed Nov. 20, 2009 (4 pages).
Office action and response history of U.S. Appl. No. 11/166,893 to Dec. 8, 2009.
Office action and response history of U.S. Appl. No. 11/037,896 to Dec. 8, 2009.
Office action and response history of U.S. Appl. No. 11/243,405 to Dec. 8, 2009.
Office action and response history of U.S. Appl. No. 11/486,545 to Dec. 8, 2009.
Office action and response history of U.S. Appl. No. 11/955,644 to Dec. 8, 2009.
Office action and response history of U.S. Appl. No. 11/303,774 to Dec. 11, 2009.
Office action and response history of U.S. Appl. No. 11/243,405 to Jan. 6, 2010.
Office action and response history of U.S. Appl. No. 11/037,896 to Jan. 11, 2010.
Office action and response history of U.S. Appl. No. 11/305,286 to Jan. 11, 2010.
Office action and response history of U.S. Appl. No. 11/167,785 to Jan. 11, 2010.
GB Examination Report for Application No. 0811839.0, mailed Jan. 22, 2010 (2 pages).
Chinese Office action Chinese application No. 200580024230.0 sent Nov. 20, 2009 with English translation (6 pages).
Chinese Office action response of Chinese application No. 200580024230.0 filed Feb. 5, 2010, along with instructions for response and associate recommendation (12 pages).
Office action and response history of U.S. Appl. No. 11/955,644 to Feb. 11, 2010.
Office action and response history of U.S. Appl. No. 11/037,896 to Feb. 27, 2010.
Office action and response history of U.S. Appl. No. 11/486,545 to Feb. 27, 2010.
European Patent Office communication and response of European application No. 06836082.5 mailed Jun. 18, 2009 (21 pages).
Office action and response history of U.S. Appl. No. 11/305,286 to Feb. 27, 2010.
Office action and response history of U.S. Appl. No. 11/640,619 to Mar. 2, 2010.
Office action and response history of U.S. Appl. No. 11/303,774 to Mar. 10, 2010.
Office action and response history of U.S. Appl. No. 11/303,773 to Mar. 11, 2010.
Office action and response history of U.S. Appl. No. 11/166,893 to Mar. 25, 2010.
Office action and response history of U.S. Appl. No. 11/402,744 to Mar. 30, 2010.
Office action and response history of U.S. Appl. No. 11/167,785 to Apr. 28, 2010.
Office action and response history of U.S. Appl. No. 11/305,286 to Mar. 30, 2010.
Office action and response history of U.S. Appl. No. 11/486,545 to May 7, 2010.
Office action and response history of U.S. Appl. No. 11/955,644 to May 13, 2010.
Office action and response history of U.S. Appl. No. 11/243,405 to Apr. 13, 2010.
Chinese Office action with English translation of Chinese application No. 200580024230.0 dated May 17, 2010 (6 pages).
Response filed May 21, 2010 to GB Examination Report for Application No. 0811839.0, dated Jan. 22, 2010 (12 pages).
GB Examination Report for Application No. 0811839.0, mailed Jun. 3, 2010 (3 pages).
Office action and response history of U.S. Appl. No. 11/303,773 to Jun. 11, 2010.
Office action and response history of U.S. Appl. No. 11/037,896 to Jun. 16, 2010.
Office action and response history of U.S. Appl. No. 11/486,545 to May 28, 2010.
Office action and response history of U.S. Appl. No. 11/243,405 to Jun. 17, 2010.
Office action and response history of U.S. Appl. No. 11/640,619 to Jun. 18, 2010.
Office action and response history of U.S. Appl. No. 11/166,893 to Apr. 13, 2010.
Office action and response history of U.S. Appl. No. 11/303,774 to Jun. 10, 2010.
Office action and response history of U.S. Appl. No. 11/955,644 to Jun. 3, 2010.
USPTO Notice of Allowance in U.S. Appl. No. 11/486,545, dated Jul. 28, 2010, 8 pages.
Fish & Richardson, P.C., Amendment in Reply to Action dated Mar. 25, 2010 in U.S. Appl. No. 11/166,893, filed Jun. 28, 2010, 19 pages.
USPTO Final Office Action in U.S. App. U.S. Appl. No. 11/305,286, dated Jun. 24, 2010, 39 pages.
Response filed Aug. 9, 2010 to GB Examination Report for Application No. 0811839.0, dated Jun. 3, 2010 (10 pages).
Response filed Aug. 2, 2010 to Chinese office action for Chinese application No. 200580024230.0 dated May 17, 2010 (41 pages).
USPTO Final Office Action in U.S. Appl. No. 11/303,773, dated Aug. 18, 2010, 12 pages.
Fish & Richardson, P.C., Amendment in Reply to Action dated Mar. 30, 2010 in U.S. Appl. No. 11/402,744, filed Aug. 30, 2010, 12 pages.
Notice of Allowance in U.S. Appl. No. 11/303,774, dated Aug. 31, 2010, 4 pages.
USPTO Office Action in U.S. Appl. No. 11/166,893, dated Sep. 2, 2010, 31 pages.
Fish & Richardson, P.C., Supplemental Amendment in Reply to Action dated Jun. 18, 2010 in U.S. Appl. No. 11/640,619, filed Oct. 18, 2010, 20 pages.
USPTO Final Office Action in U.S. Appl. No. 11/167,785, dated Oct. 15, 2010, 10 pages.
Fish & Richardson, P.C., Amendment in Reply to Action dated Jun. 24, 2010 in U.S. Appl. No. 11/305,286, filed Oct. 25, 2010, 31 pages.
USPTO Final Office Action in U.S. Appl. No. 11/402,744, dated Nov. 12, 2010, 22 pages.

(56) References Cited

OTHER PUBLICATIONS

Supplemental Notice of Allowability in U.S. Appl. No. 11/303,774, dated Nov. 22, 2010, 9 pages.
Notice of Allowability in U.S. Appl. No. 11/486,545, dated Nov. 8, 2010, 6 pages.
Notice of Allowance in U.S. Appl. No. 11/303,774, dated Dec. 21, 2010, 8 pages.
Examiner Interview Summary in U.S. Appl. No. 11/166,893, dated Dec. 17, 2010, 3 pages.
USPTO Final Office Action in U.S. Appl. No. 11/305,286, dated Jun. 24, 2010, 39 pages.
Final Office Action in U.S. Appl. No. 11/640,619, dated Jan. 7, 2011, 24 pages.
Notice of Allowance in U.S. Appl. No. 11/037,896, dated Jan. 5, 2011, 5 pages.
Notice of Allowance in U.S. Appl. No. 11/303,773, dated Dec. 30, 2010, 9 pages.
Fish & Richardson, P.C., Amendment in Reply to Final Office Action dated Nov. 12, 2010 in U.S. Appl. No. 11/402,744, filed Feb. 14, 2011, 12 pages.
Japanese Office action of application No. 2007-527408 issued Nov. 24, 2010, mailed Nov. 29, 2010 with English translation (21 pages).
Fish & Richardson, P.C., Amendment in Reply to Office Action dated Sep. 2, 2010 in U.S. Appl. No. 11/166,893, filed Jan. 3, 2011, 18 pages.
USPTO Notice of Allowance in U.S. Appl. No. 11/166,893, dated Mar. 18, 2011, 21 pages.
Notice of Allowability in U.S. Appl. No. 11/486,545, dated Mar. 11, 2011, 9 pages.
USPTO Non-Final Office Action in U.S. Appl. No. 11/402,744, dated Apr. 1, 2011, 14 pages.
Notice of Allowance in U.S. Appl. No. 11/303,774, dated Apr. 4, 2011, 7 pages.
Notice of Allowance in U.S. Appl. No. 11/303,773, dated Apr. 15, 2011, 6 pages.
USPTO Supplemental Notice of Allowance in U.S. Appl. No. 11/166,893, dated Apr. 22, 2011, 17 pages.
International Preliminary Report on Patentability for PCT international application No. PCT/US2006/047524, mailed Apr. 28, 2011 (8 pages).
Notice of Allowance in U.S. Appl. No. 11/037,896, dated May 17, 2011, 8 pages.
Response filed May 30, 2011 to Japanese Office action issued in application No. 2007-527408, Nov. 24, 2010, mailed Nov. 29, 2010 (31 pages).
Fish & Richardson, P.C., Amendment in Reply to Office Action dated Apr. 1, 2011 in U.S. Appl. No. 11/402,744, filed Jun. 30, 2011, 13 pages.
USPTO Final Office Action in U.S. Appl. No. 11/402,744, dated Oct. 6, 2011, 14 pages.
Non Final Office Action in U.S. Appl. No. 12/857,206, dated Oct. 20, 2011, 28 pages.
USPTO Notice of Appeal Decision in U.S. Appl. No. 11/167,785, dated May 3, 2011, 2 pages.
Fish & Richardson, P.C., Response to Notice of Appeal Decision dated May 3, 2011 in U.S. Appl. No. 11/167,785, filed Nov. 3, 2011, 13 pages.
Japanese Office action issued in application No. 2007-527408 on Nov. 11, 2011, mailed Nov. 16, 2011 (5 pages).
Fish & Richardson, P.C., Response to Final Office Action dated Oct. 6, 2011 in U.S. Appl. No. 11/402,744, filed Jan. 6, 2012, 13 pages.
Fish & Richardson, P.C., Response to Non Final Office Action dated Oct. 20, 2011 in U.S. Appl. No. 12/857,206, filed Mar. 20, 2012, 19 pages.
USPTO Non Final Office Action in U.S. Appl. No. 11/955,644, dated May 4, 2012, 17 pages.
European Patent Office communication from European application No. 06785637.7 mailed Apr. 27, 2012 (2 pages).
Fish & Richardson, P.C., Response to Notice of Panel Decision from Pre-Appeal Brief Review dated Feb. 23, 2012 in U.S. Appl. No. 11/402,744, filed May 23, 2012, 11 pages.
Final Office Action in U.S. Appl. No. 11/037,896, dated May 24, 2012, 29 pages.
Response to Japanese Office action issued in application No. 2007-527408 on Nov. 11, 2011, mailed Nov. 16, 2011, response filed May 16, 2012 (26 pages).
USPTO Non Final Office Action in U.S. Appl. No. 11/167,785, dated Jun. 7, 2012, 9 pages.
Fish & Richardson, P.C., Response to Non Final Office Action dated May 4, 2012 in U.S. Appl. No. 11/955,644, filed Aug. 3, 2012, 14 pages.
Fish & Richardson, P.C., Response to Final Office Action dated May 24, 2012 in U.S. Appl. No. 12/857,206, filed Aug. 23, 2012, 17 pages.
Supplemental Search Report from European Application No. 05750705.5 issued Aug. 2, 2012 (102 pages).
Fish & Richardson, P.C., Response to Non Final Office Action dated Jun. 7, 2012 in U.S. Appl. No. 11/167,785, filed Sep. 7, 2012, 11 pages.
USPTO Final Office Action in U.S. Appl. No. 11/955,644, dated Sep. 21, 2012, 22 pages.
Fish & Richardson, P.C., Response to Final Office Action dated Sep. 21, 2012 in U.S. Appl. No. 11/955,644, filed Dec. 20, 2012, 16 pages.
USPTO Non Final Office Action in U.S. Appl. No. 13/430,422, dated Dec. 7, 2012, 6 pages.
USPTO Non Final Office Action in U.S. Appl. No. 11/167,785, dated Dec. 6, 2012, 9 pages.
Fish & Richardson, P.C., Response to Non Final Office Action dated Dec. 7, 2012 in U.S. Appl. No. 13/430,422, filed Mar. 4, 2013, 9 pages.
Fish & Richardson, P.C., Response to Final Office Action dated Dec. 6, 2012 in U.S. Appl. No. 11/167,785, filed Mar. 6, 2013, 13 pages.
Examination Report from European Application No. 05750705.5 issued Mar. 11, 2013 (9 pages).
Fish & Richardson, P.C., Amendment After Allowance in U.S. Appl. No. 12/857,206, filed Feb. 21, 2013, 10 pages.
Response to European Patent Office communication from European application No. 06785637.7 mailed Apr. 27, 2012, filed Jun. 24, 2012, 3 pages.

RADIO NETWORK CONTROL

CLAIM OF PRIORITY

This application is a continuation and claims priority under 35 U.S.C. §120 to U.S. patent application Ser. No. 09/891,103, filed Jun. 25, 2001 now U.S. Pat. No. 8,160,020, the entire contents of which are herby incorporated by reference.

BACKGROUND

This invention relates to radio network control.

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for IP packet data services that can deliver a shared forward link transmission rate of up to 2.46 Mbit/s per sector using only (1×) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," $3^{rd}$ Generation Partnership Project 2 (3GPP2), Version 1.0, Jul. 14, 2000), HDR networks can be built entirely on IP technologies, all the way from the mobile Access Terminal (AT) to the global Internet, thus taking full advantage of the scalability, redundancy and low-cost of IP networks.

HDR has been adopted by TIA (Telecommunications Industry Association) as a new standard in the CDMA2000 family, an EVolution of the current 1xRTT standard for high-speed data-only (DO) services, formally referred to as 1xEV-DO or IS-856. IS-856 systems are typically implemented using the radio access network architecture shown in FIG. 1. Here the Access Terminal (AT) 10 may be a laptop computer, a Personal Digital Assistant (PDA), a dual-mode voice/data handset, or another device, with built-in IS-856 support.

Figure 1:
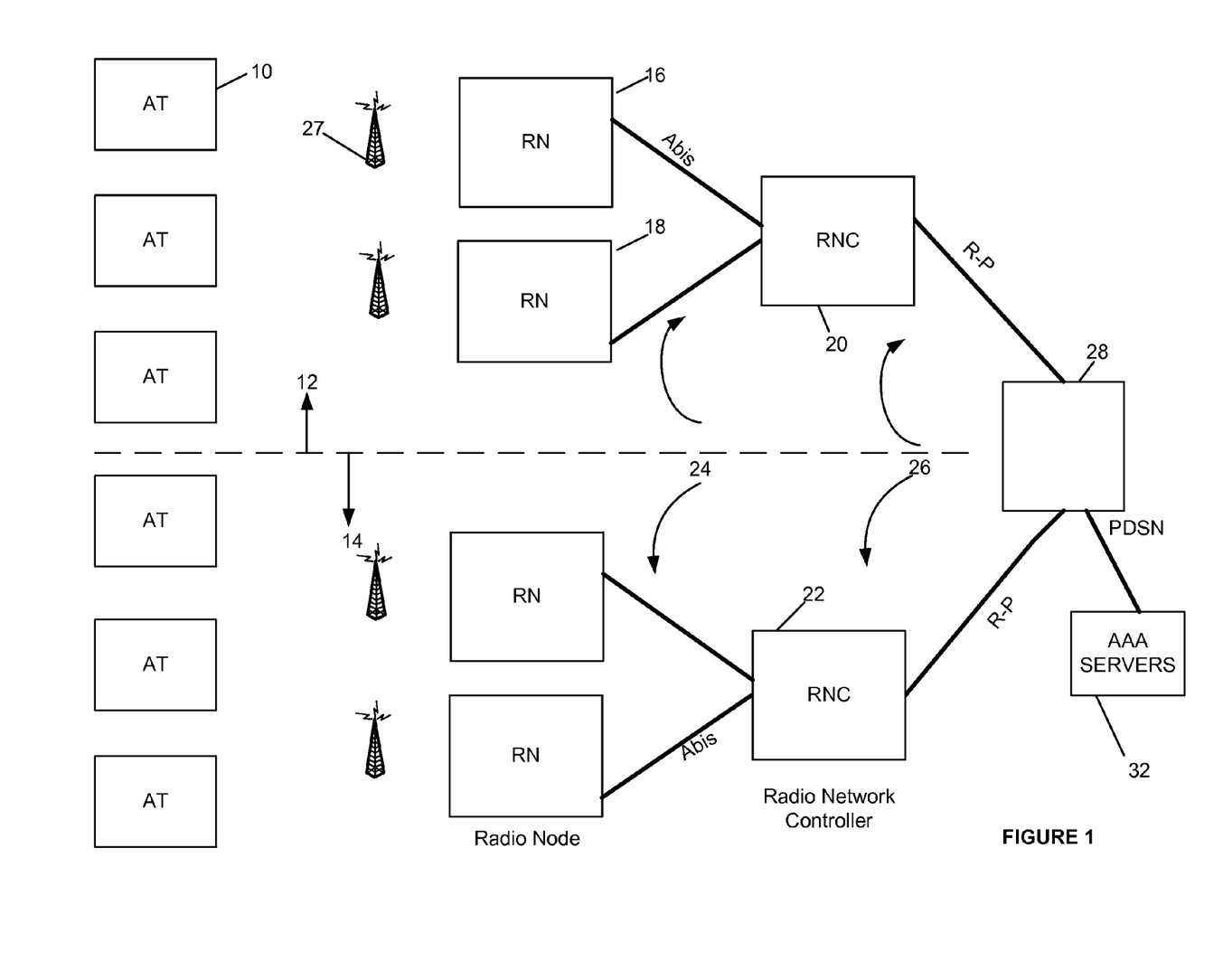
FIGS. 1 through 4 show networks.

The entire administrative service area of a wireless access provider may be divided into one or more subnetworks (or subnets) 12, 14. Each subnet 12 includes a set of Radio Nodes (RN's) 16, 18 and one or more Radio Network Controllers (RNC) 20, 22. The RN's are connected to RNC's over a backhaul network 24. In existing 2G and 3G wireless networks, each RN is connected to only 1 RNC using dedicated leased lines or ATM permanent virtual circuits (PVC's). Further, RNC's are connected to each other using dedicated leased lines or ATM PVC's. In a new generation of IP-based radio access networks, the backhaul can be implemented using a shared IP or metropolitan Ethernet network which supports many-to-many connectivity between RN's and RNC's.

Each RNC typically controls 25-100 RN's. Each RN typically supports 1-4 carriers each of 1.25 MHz of bandwidth. Further, each cell area (not shown) is typically divided into multiple sectors (typically 3 or 6) and the RN has one radio transceiver 27 for each sector.

Each RNC is connected over an IP network 26 to one or more Packet Data Serving Node's (PDSN's) 28 (see TIA references cited earlier). The RNC communicates with the PDSN over a standard interface termed the R-P (Radio-Packet) interface 30.

The R-P interface is further broken into 2 interfaces: the A10 interface used to carry data and the A11 interface used to carry signaling. A PDSN can be viewed as an edge router that supports mobility; it maintains link layer connectivity to AT's through the Access Network. The PDSN also interfaces to AAA servers 32 for Authentication, Authorization and Accounting (AAA).

In IS-856 radio access networks as currently defined by 3GPP2 in 1xEV-DO IOS Phase 1 (IS-878), each RN is uniquely associated with an RNC and each subnet contains only one RNC. As a result when an AT moves from the coverage area of one RNC to the coverage area of another, it performs a handoff.

Every time a dormant AT crosses a subnet boundary, it initiates a dormant handoff by sending a UATI_Request. The AT recognizes the need for a dormant handoff by monitoring the 128-bit SectorID being broadcast by the sectors. All sectors that belong to the same subnet have SectorID's that fall within a certain range. The 128-bit Universal Access Terminal Identifier (UATI) assigned to an AT in a given subnet falls within the same range. When the AT moves into the coverage area of another subnet, it compares its UATI with the SectorID being broadcast by its serving sector. When these do not belong to the same range, the AT knows that it has crossed a subnet boundary and initiates the dormant handoff by sending a UATI_Request.

A first purpose of a dormant handoff is to inform the PDSN to send packets arriving for that AT to the new serving RNC. Dormant handoffs involve a relocation of the R-P (A10) session from the old serving RNC to the new serving RNC. Without such handoffs, the PDSN would send packets to an old serving RNC. Since the old serving RNC does not know the location of the AT outside its subnet, AT's packets may be lost.

A second purpose of a dormant handoff is to transfer session information between RNC's. In IS-856, each RNC maintains certain session information about the AT. Such session information is needed for communication over the air interface. Session information includes the Universal Access Terminal Identifier (UATI), security keys for access channel authentication and encryption, and other protocol constants. Everytime the AT crosses an RNC boundary (in this case a subnet), a new UATI needs to be assigned to the AT and the remaining session information needs to be transferred from the old serving RNC to the new serving RNC. Such a transfer requires a network link between the RNC's. Without such session transfer, every handoff between RNC's would result in a new and lengthy session establishment, taking up precious air resources and causing delays. When the footprint of an RNC is small, dormant handoffs occur frequently, resulting in excessive use of airlink resources (for the new UATI assignment), extra processing for the RNC's to implement the session transfer, and extra processing for the RNC and PDSN to relocate the A10 connection.

To address a similar situation in CDMA2000 networks, a new logical network element often referred to as a Packet Control Function (PCF) has been added. The PCF provides a single-interface to a PDSN and serves multiple RNC's. Therefore, when the AT crosses an RNC boundary, an A10 relocation is not required as explained below.

In CDMA2000 systems, mobility management is provided by the Mobile Switching Center (MSC)/Visitor Location Register (VLR). When an AT provides a location update to inform the network of its new location, this information is immediately forwarded to the serving MSC. Such location updates are provided by the AT when the it moves sufficiently away from the sector where it last provided a location update.

When the PDSN receives a packet data for an AT, it sends the packet to the PCF. The PCF, recognizing that no traffic channel exists for this AT, in turn informs the RNC that last served this AT. That RNC then informs the MSC. The MSC, equipped with location information stored in the VLR, requests one or more RNC's to page the AT from a certain set of sectors. Once the AT responds with an Origination message to its serving RNC, the serving RNC sets up a so-called A8/A9 connection to the PCF. Soon after, the PCF starts forwarding the received packets to the serving RNC.

Figure 2:
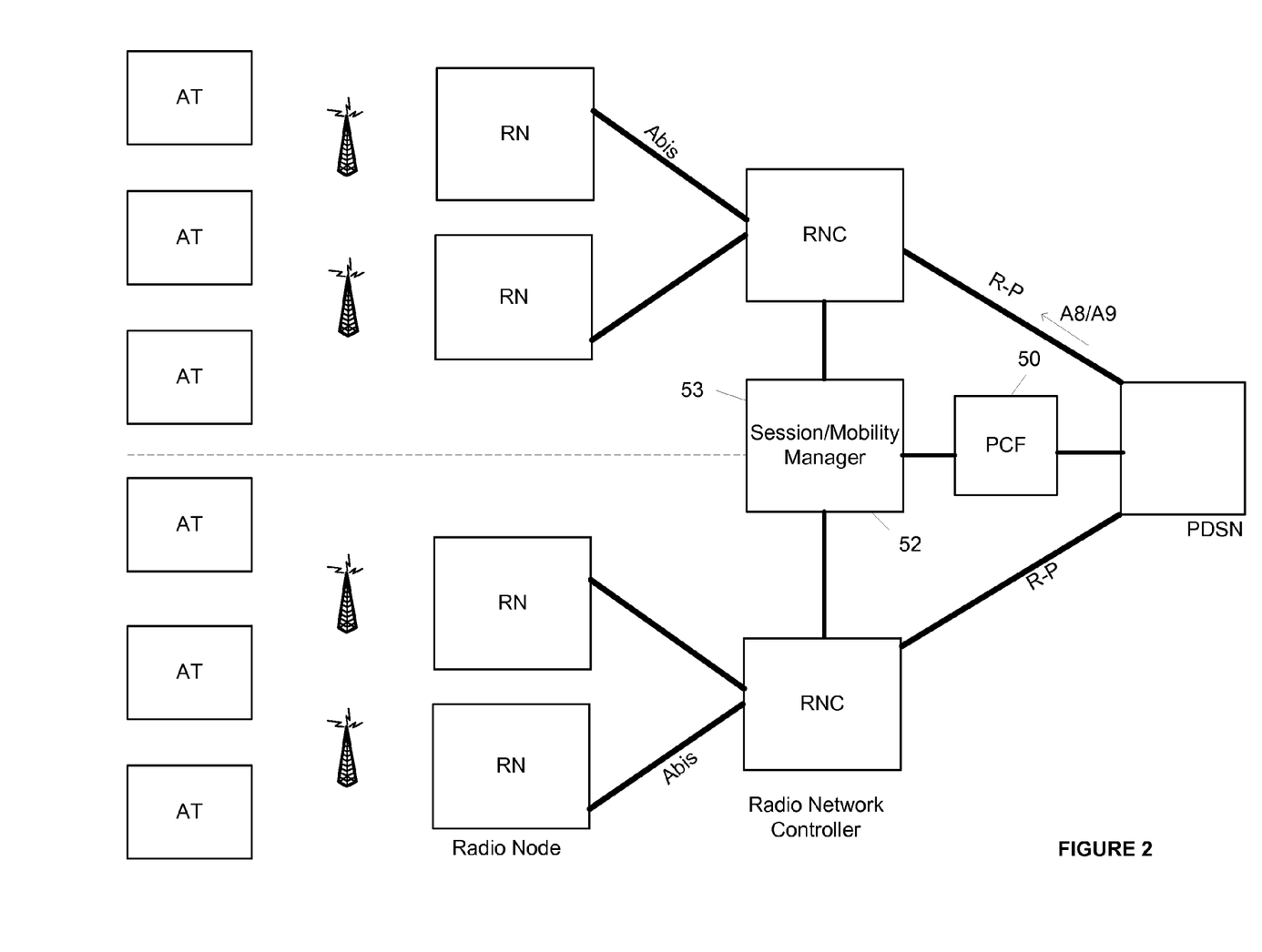

A similar procedure can be used in IS-856, by adding a similar PCF entity 50, as shown in FIG. 2. (A system like the one described here has been proposed in 3GPP2 for 1xEV-DO IOS Phase 2.) However, since IS-856 networks do not have an MSC, it is necessary to define a separate mobility management function (Mobility Manager 52) responsible for maintaining the location information for every AT that is being served by the RNC's under its control. Such a Mobility Manager can be integrated into the PCF, or can be a separate network entity. Any time the AT provides a location update by sending an IS-856 RouteUpdate message, its location information is immediately forwarded by the serving RNC to the Mobility Manager. When the PDSN receives a packet data for an AT, it sends the packet to the PCF, which in turn informs the Mobility Manager. The Mobility Manager, equipped with the location information requests, either directly or via the RNC that last received a location update from the AT, requests one or more RNC's to page the AT from a select set of sectors. Once the AT responds with a ConnectionRequest message, the serving RNC sets up a so-called A8/A9 connection to the PCF. Soon after, the PCF starts forwarding received packets to the serving RNC. This approach eliminates the need for relocating the A10 (R-P) session to the PDSN every time the AT crosses an RNC boundary, effectively expanding the size of the subnet to cover multiple RNC's.

The Mobility Manager function does not address the session transfer issue described earlier. For this purpose, another logical network element, a Session Manager 53 is introduced. Like the Mobility Manager, a Session Manager controls multiple RNC's, and maintains session information for all sessions handled by the RNC's that it controls. Like the Mobility Manager, the Session Manager may be a separate network element, may be combined with the Mobility Manager or may be integrated with the PCF.

When a new session is to be established, the serving RNC interacts with the Session Manager. The Session Manager provides the UATI to be assigned to the AT and stores the session parameters that the serving RNC has determined during the key exchange and configuration phases of the session set-up. Whenever the AT establishes a new connection with its serving RNC, the RNC retrieves the session information from the Session Manager. In the case where the Session Manager is integrated with the PCF, this can be accomplished during the A8/A9 connection set-up procedures. The RNC provides the latest session information back to the Session Manager when a connection is closed. Again, in the case where the Session Manager is integrated with the PCF, this can be accomplished during the A8/A9 connection tear-down procedures. Additional delays are caused by passing of session information back and forth between the Session Manager and the RNC during every connection set-up.

The proposed 1xEV-DO Phase 2 architecture also produces frequent inter-RNC soft handoffs. This usually requires complex procedures that involve the old and new serving RNC's.

SUMMARY

In general, in one aspect, the invention features (a) in connection with a mobile wireless subnetwork including multiple radio network controllers and multiple radio nodes, associating a session established for an access terminal with a serving radio network controller, (b) maintaining the association as the access terminal moves from the coverage area of one radio node to the coverage area of another radio node within the same subnetwork, and (c) routing access channel packets from an access terminal having an existing session to the serving radio network controller by determining the IP address of the serving radio network controller using a session identifier.

Implementations of the invention may include the following features. The routing is performed by an RN or by a broker radio network controller in the subnetwork. An RN forwards a received access channel packet to the broker radio network controller. The serving radio network controller and the broker radio network controller are connected by a high-speed LAN. The serving radio network controller and the broker radio network controller are connected by a high-speed LAN. The session identifier includes the Universal Access Terminal Identifier (UATI) of the IS-standard. The radio node routes packets received from an access terminal without an existing session to a default RNC with whom the radio node is associated. A radio node receives paging requests from more than one radio network controller and forward link traffic channel packets from more than one radio network controller. A radio node sends reverse link traffic channel packets to more than one radio network controller. Traffic channel radio resources are managed in the radio nodes and a radio network controller requests radio resources from a radio node before adding any of its sectors to a traffic channel. The radio network controllers reside in different locations and are connected via a metropolitan-area network. The session association is transferred from one radio network controller in one subnetwork to another radio network controller in another subnetwork based upon a predetermined criterion. The session transfer is triggered by the access terminal upon detection of a subnet change or by the network. At the serving radio network controller, a packet data serving node is selected to serve the access terminal. At the serving radio network controller, a mobility manager maintains a current position of the access terminal.

An RNC Resource Control Agent assigns sessions to radio network controllers. The RNC Resource Control Agent resides on a separate server. An RNC Resource Control Agent also determines the association between the RN's and their default RNC's. The RNC Resource Control Agent also performs load balancing in assigning sessions to radio network controllers. The RNC Resource Control Agent also selects a new RNC in network-initiated dormant handoffs. The Radio Resource Control Agent function is distributed among the radio network controllers and radio nodes, and the radio network controllers and the radio nodes continuously communicate resource information to each other to enable individual network nodes to make session assignment decisions on their own. The Radio Resource Control Agent also maintains session information for all sessions under its control.

The radio network controllers also include a PDSN function that includes the Simple IP, Mobile IP and AAA client functions.

In general, in another aspect, the invention features the radio node configured to route access channel packets from an access terminal having an existing session to a serving radio network controller by determining the IP address of the serving radio network controller using a session identifier. Other advantages and features will become apparent from the following description, and from the claims.

DESCRIPTION

FIGS. 1 through 4 show networks.

Existing 3G wireless network architectures, including the ones discussed above for IS-856, assume a fixed association between RN's and RNC's. In other words, all traffic flowing from or to an RN always goes through the same RNC. This requires complex hierarchical structures to handle dormant handoffs between RNC's and requires frequent and delay-prone inter-RNC (soft) handoffs. Fixed associations between RN's and RNC's are needed in circuit-switched voice applications when point-to-point dedicated leased lines are used for backhaul connectivity between RN's and RNC's as illustrated in FIGS. 1 and 2.

Client/Server Architecture for RNC Clusters

Figure 3:
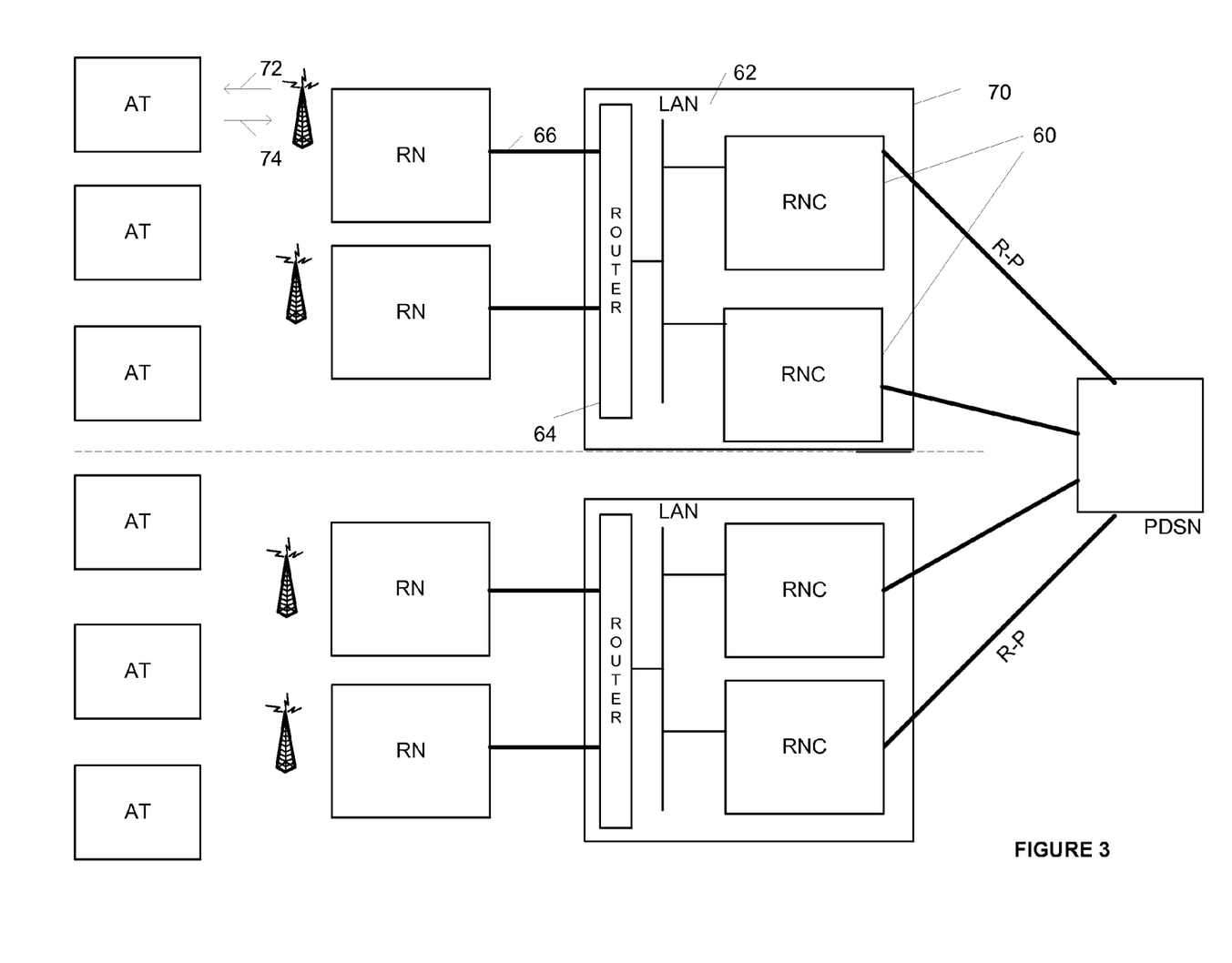

First, as shown in FIG. 3, consider the case where a set of RNC's 60 are co-located in a data center and are connected together via a high-speed Local Area Network (LAN) 62 such as a Gigabit Ethernet LAN. In this case, RNC's connect to the network via LAN interfaces and a router 64 provides the connectivity to the external network. We refer to such a configuration as an RNC cluster (or pool). (Later, we will describe how the same concept can be extended to RNC's connected over a metropolitan-area network.) Such clustering is possible for packet data and Voice over IP (VoIP) applications. In the past, when the main traffic type carried through a wireless network was circuit-switched voice, such clustering using an Ethernet LAN was not feasible. RN's may connect to the router in the data center using dedicated leased lines 66. We assume that RN's and RNC's are all IP addressable. In other words, any RN served by the cluster can communicate directly at the IP level with any of the other RNC's in the cluster. But in this section we assume that no direct communication link exists between RN's that are served by a cluster and other RNC's outside the cluster.

When constructing an RNC cluster such as the one described above, it is important to avoid any handoff boundaries between individual RNC's so that the entire cluster can behave as if it were one big RNC. This would eliminate unnecessary handoffs due to mobility, thereby greatly improving scalability and reliability.

To accomplish this, suppose we define an IS-856 subnet 70 to be the entire footprint of the RNC cluster, not the footprint of just one RNC. In other words, all the RN's served by the cluster now belong to the same subnet. To simplify the system operation, we continue to associate each RN in the subnet with only one RNC in the cluster. This association is established when an RN is first powered. The detailed meaning of this association will be explained later.

Access Channel Packet Routing

Each sector in an RN can transmit to an AT over the forward traffic or control channels 72. Similarly, each sector in an RN can receive from an AT over the reverse traffic or access channels 74. The access channel and the reverse traffic channels are separated by code division multiplexing using a Long Code Mask, whereas the control channel and the forward traffic channels are separated by time-division multiplexing using a preamble. The preamble identifies a forward link physical layer packet as a control channel packet or as a traffic channel packet associated with a certain MAC Index. A MAC Index, an integer between 0 and 63, is unique within a sector and is assigned by the RN and RNC at the time of connection establishment. Similarly, the Long Code Mask identifies a reverse link physical layer packet as an access channel packet or a specific traffic channel packet. The Long Code Mask is based on the AT's UATI for the traffic channel, and is based on the SectorID of the serving sector for the access channel. The sending AT of an access channel packet and the recipient AT of a control channel packet are indicated in the ATI field of a MAC Layer header.

Whenever an RN receives a MAC Layer packet on one of its access channels, it always forwards the packet, without even looking at its content, to its Default RNC in the cluster with whom it is associated. As such, when a packet carrying a UATI_Request message is received from an AT, it is forwarded by the receiving RN to the Default RNC. The RN encapsulates the MAC Layer packet in an IP packet (possibly multiplexed with MAC Layer packets of other AT's) with a destination IP address equal to an IP address of the serving RNC. The IP packet is carried over the backhaul network to an aggregation router at the data center and the router forwards it to the serving RNC over the Ethernet LAN. All access channel packets include an address field that identifies the sending AT. When the sending AT has already been assigned a UATI by the subnet, the address field contains that UATI. When the sending AT does not yet have a UATI, the address field contains a Random Access Terminal Identifier (RATI), which is randomly selected by the AT. The first two bits of the address field indicate whether the address is a UATI or a RATI.

When the (Ethernet) I/O subsystem of an RNC receives a UATI_Request message from an AT with an address field that contains a RATI or an unrecognized UATI, the RNC assumes the role of the serving RNC to handle the session and assigns the session to one of its server cards. The AT is then assigned a UATI within some predetermined range. This range, which identifies the serving RNC to all other RNC's in the cluster, is known by all the RNC's in the cluster, but is not known by the AT. The range of the UATI's that belong to a certain RNC may further be subdivided to identify the server module within the serving RNC that is handling the session. The serving RNC also establishes an A10 connection with the PDSN in order to facilitate the data transfer between the AT and the PDSN. The A10 connection terminates on the server module handling the session.

Page Routing

While dormant, the AT sends RouteUpdate messages, as needed, to provide information about its current location. This mobility information is maintained at a Mobility Manager in the serving RNC. Since a subnet covers the entire footprint of the RNC cluster, when the AT crosses the boundary between two RNC's in the same cluster, it does not detect a subnet change and therefore does not initiate a dormant handoff. But when the AT sends an access channel message to an RN that is associated with a different RNC (broker RNC) in the cluster, the packet(s) carrying that message are sent by the RN to the broker RNC. The I/O subsystem in the broker RNC examines the address field of all arriving access channel packets and reads the UATI. From the UATI, the I/O subsystem determines by table look-up the identity of the serving RNC and forwards the access channel packet to that RNC over the high-speed LAN. When a UATI is served locally, the I/O subsystem first determines the server module that is handling the session and forwards the packet to that module using an internal bus of the serving RNC.

If packet data is received from the PDSN for a dormant AT, the packets are always forwarded over the A10 interface to a specific server module on the serving RNC. That server module then obtains the location information for that AT from the Mobility Manager in the serving RNC. The serving RNC then sends a paging message via a set of RN's that are determined based on the last Route Update message received from the AT.

The paging message is sent via the control channel of one or more sectors that belong to the RNC cluster. The RN's transmitting the paging message may not be associated with the serving RNC (i.e., they may have a different Default RNC), but they need to be associated with one of the RNC's in the cluster.

Connection Establishment

When it receives a ConnectionRequest message from the AT, either directly or via a broker RNC, the server module in the serving RNC examines the pilot strengths reported by the AT in the RouteUpdate message accompanying the ConnectionRequest message. To simplify system operation, we assume that each RN's radio resources are managed by a Radio Resource Control function in the RNC with whom the RN is associated. Therefore, when the serving RNC wants to establish a connection that involves RN's that are associated with other RNC's, it first communicates directly with the Radio Resource Control function on those RNC's to check for resource availability. Such communication occurs over the high-speed LAN. When sufficient radio resources are available, the serving RNC establishes the necessary traffic channel communication links with the RN's and sends a TrafficChannelAssignment message to the AT to initiate the connection set up. Once a traffic channel has been established packets flow directly between the RN's and the serving RNC without any involvement of any broker RNC. Such direct routing eliminates the delays typically found in soft handoff procedures that involve triangular routing through another RNC.

When a new connection involves an RN that is outside the footprint of the RNC cluster (different subnet), a soft handoff procedure is implemented. In this case, the serving RNC communicates with the RNC's outside the cluster over a metropolitan-area network to obtain radio resources. If the radio resources are available, the serving RNC establishes a communication link with that RN, but this time through the RNC outside the cluster. Such triangular routing is needed because here we assumed that there is no direct physical link between the serving RNC and the RN outside the subnet.

Dormant Handoffs/Subnet Change

When the AT crosses the boundary of an RNC cluster, it will detect a subnet change and initiate a dormant handoff between its serving RNC in the cluster and a new RNC outside the cluster. This handoff involves the assignment of a new UATI by the new RNC, the transfer of the IS-856 session from the old RNC to the new RNC and the relocation of the A10 interface from the old RNC to the new RNC.

Improved Client/Server Architecture

The scheme described so far can be improved in couple of areas. First, we can eliminate the triangular routing of access channel packets via a broker RNC by moving that routing function to the RN's. This will reduce delays in handling access channel packets, for example during connection set-up, at the expense of some increase in processing power at the RN. Eliminating triangular routing will also allow us to extend some of the benefits of RNC clusters to RNC's that are connected across a metropolitan-area network.

Figure 4:
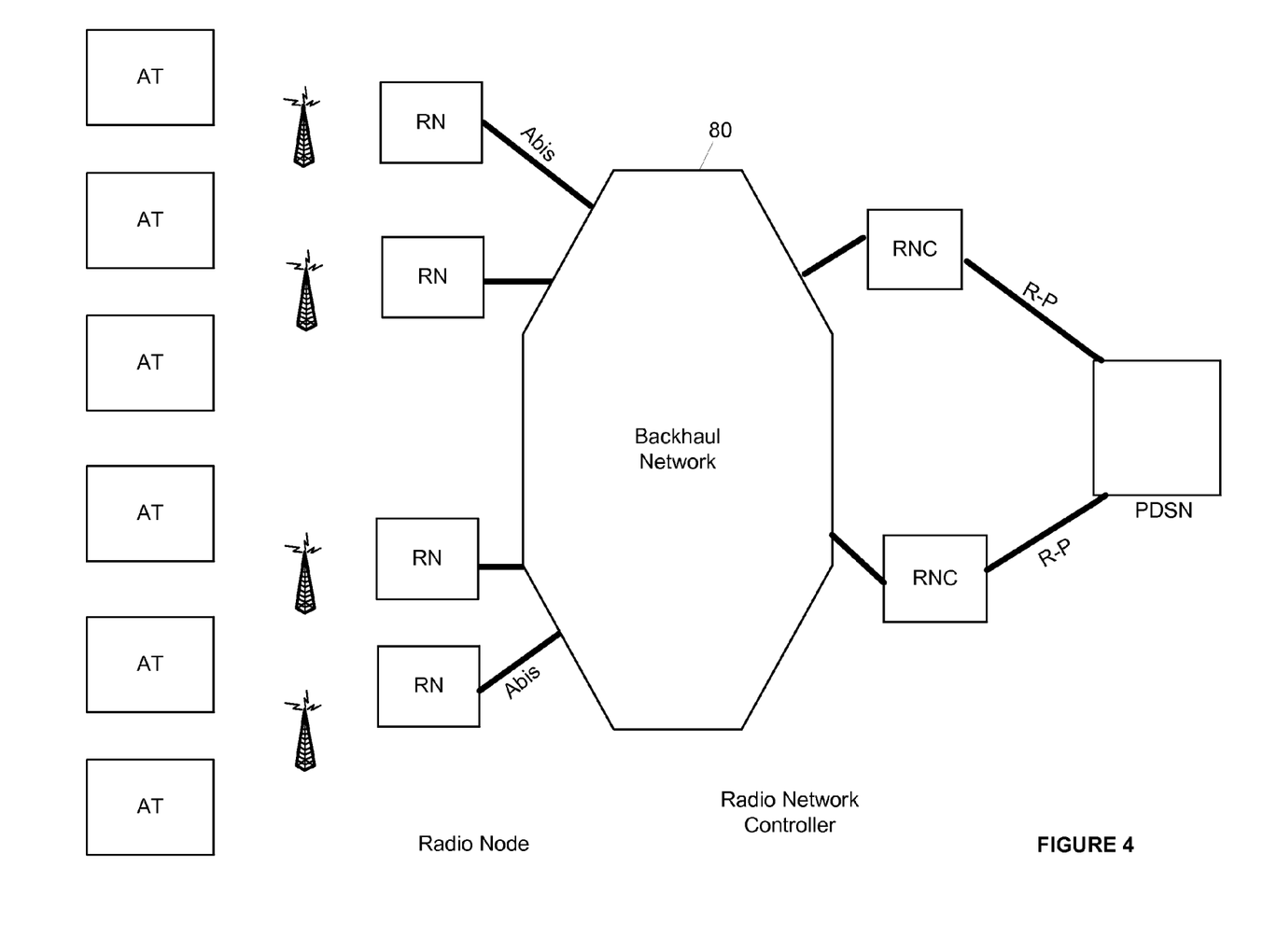

Second, as shown in FIG. 4, for backhaul networks 80 that support many-to-many connectivity between RN's and RNC's, two additional improvements are possible: A) We can extend a subnet beyond the boundaries of a single RNC cluster, by allowing the serving RNC to send Page Requests to RN's who are associated with an RNC that is not in the same cluster; B) We can move the Radio Resource Control function from the RNC's to the RN's, thereby further reducing delays in connection set-up procedures.

These improvements allow us better to exploit the flexibilities of IP and metropolitan Ethernet networks and result in a more distributed system where an AT may remain attached to its serving RNC regardless of its position, except when the distance between the AT and the serving RNC becomes excessive.

Avoiding Triangular Routing of Access Channel Packets

When powered on for the first time, an AT registers with the IS-856 network as follows: It acquires an IS-856 pilot being broadcast by one of the nearby sectors and synchronizes with the system. To initiate the session establishment, the AT sends a UATI_Request. As before, the AT uses a Random ATI (RATI) in the MAC Layer header to send this request.

The RN examines the address field of the access channel packet and recognizes that the originator of the message does not have an assigned UATI and forwards the packet to its Default RNC with whom it is associated, possibly when the RN is first installed. To examine the address field, the RN first extracts the MAC Layer capsule fragments from the received MAC Layer packets, and forms the MAC Layer capsule. It then reads the address field in the MAC Layer header.

After receiving the UATI_Request, the Default RNC assumes the role of the serving RNC and assigns a UATI to the AT. It then proceeds with the rest of session establishment, in particular the security key exchange and the protocol configurations. (Later, we will describe an improved version of this procedure to increase availability and to provide better load balancing.) The RNC also implements the PPP/CHAP procedure to authenticate the AT based on its Network Access Identifier (NAI). There is a one-to-one mapping between the NAI and the terminal's actual IMSI (International Mobile Subscriber Identity). This mapping is maintained in a AAA (Radius) server (not shown). The AAA server passes the AT's IMSI value to the serving RNC.

The PCF function in the serving RNC uses this IMSI value to select a PDSN as described in the IS-2001 standard and establishes an A10 connection to that PDSN. In the A11 Registration message, the PCF function provides the IMSI value of the AT along with its own SID/NID/PZID identifier to the PDSN. The AT and the PDSN then set up a PPP link, perform Simple IP or Mobile IP set-up and execute user-level authentication.

Each RN keeps a routing table for the mapping between the UATI and the serving RNC. This routing table may be provided to the RN by a network management system. As in the previous system, each RNC owns the UATI values that fall within a certain range. Whenever the RN receives an Access Channel packet, it determines from the UATI value in the MAC Layer Header the identity of the serving RNC, and routes the packet to that RNC by placing an IP address of the serving RNC in the destination address field of the IP header. This approach allows access channel packets to be delivered from any RN directly to the serving RNC in the cluster.

Avoiding Handoffs Between RNC's which are not Co-Located

Now suppose we replace the point-to-point lines between RN's and RNC clusters, by a many-to-many backhaul network that allows any RN to communicate directly with any RNC, regardless of the location of the RNC's. In such networks we will of course benefit from the direct routing of access channel packets from the RN to the serving RNC, by avoiding the triangular routing across the metropolitan-area network.

As before, mobility management for a given AT is handled entirely by the serving RNC. The AT is configured to provide distance-based location update in dormant mode. In other words, whenever the serving sector is more than a certain distance away from the sector where it last sent a RouteUpdate message, the AT sends a new RouteUpdate message to the serving sector over the Access Channel. The RouteUpdate message is forwarded by the RN to the serving RNC which then keeps track of the location of the AT.

When the serving RNC wants to page an AT, it first determines the RN or RN's from which it wants to send the page, depending on the time and position indicated in the most recent RouteUpdate message received from the AT. It is assumed here that the serving RNC knows the IP addresses of all the RN's in the radio access network. The serving RNC sends the paging message to the appropriate set of RN's directly. These RN's then page the AT over their respective control channels.

All sectors in an IS-856 network broadcast in their overhead channel their SectorID and Subnet Mask. For a relatively small network, one can set the Subnet Mask to 0, thereby implying that the entire network is one big subnet. In this scenario, the AT never detects a subnet change. Therefore, the AT remains attached to the original serving RNC and never triggers a dormant inter-RNC handoff. The A10 connection to the PDSN also remains fixed regardless of the position of the AT.

If the radio access network covers a geographically large area, it may be prudent to force a dormant inter-RNC handoff, when the AT moves too far away from the serving RNC. In this case, the Subnet Mask should be chosen greater than 0. Then, when the AT crosses the subnet boundary, a dormant handoff occurs and the A10 connection is relocated. Further, the AT is assigned a new UATI and session parameters are transferred from the old serving RNC to the new serving RNC.

Faster Connection Using Distributed Radio Resource Control

Now we describe how moving the Radio Resource Control from the RNC's to the RN's reduces the set-up time for connections that involve multiple RNC's. Whenever the AT sends a ConnectionRequest message over the access channel along with a RouteUpdate message to initiate a new connection, the message is immediately forwarded from the receiving RN to the serving RNC. The serving RNC examines the RouteUpdate message to determine a likely set of sectors that may be included in the Active Set. The serving RNC then corresponds directly with the RN's where these sectors reside, to request traffic channel and backhaul resources. The RN's either decline, or accept and allocate the needed radio resources. If resources are available from a sufficient set of RN's, the serving RNC accepts the connection request, and sends a TrafficChannel assignment message over the Control Channel to the AT. The AT then starts transmitting on the Reverse Traffic Channel (RTC). Once it acquires the RTC, the RN sends an RTCAck message to the AT to indicate the acquisition of the RTC signal. The AT then responds with a TrafficChannelComplete message to indicate the completion of the Connection set-up.

In this procedure each RN controls its own radio resources, both with respect to hardware resources available on the RN, as well as the management of interference across its sectors. As a result, the admission control function is split between the RN and the serving RNC. RN's provide local admission control for the sectors they control while the serving RNC provides a global admission control. Similarly, when a sector in a given connection is inactive for some period of time, it can initiate the procedure for closing the connection by sending a request to the serving RNC to close the connection. The serving RNC then makes a global decision on whether to remove that sector from the connection, close the entire connection or do nothing.

Packet Routing Between RN and RNC-in More Detail

When a sector in the RN receives a MAC Layer packet on a reverse traffic channel, it forwards the packet to an I/O card after adding a Stream Identifier that includes the UATI of the sending AT along with its own SectorID. The I/O card uses the UATI value to look up the IP address of the serving RNC. It then encapsulates the MAC Layer packet together with its Stream Identifier in an IP packet whose destination address is set to the IP Address of the serving RNC. The I/O module in the serving RNC, upon receiving the packet, reads the UATI value to determine the server module that handles this session. It then passes the packet along with the Stream Identifier to that server module for further processing.

When a sector in the RN receives a MAC Layer packet on the access channel, it first reads the UATI in the ATI field of the MAC Layer Header and then forwards the packet to an I/O card after adding a Stream Identifier that includes the UATI of the sending AT along with the serving sector's SectorID. The I/O card in the RN again uses the UATI value to look up the IP address of the serving RNC. It encapsulates the MAC Layer packet together with its Stream Identifier in an IP packet whose destination address is set to the IP Address of the serving RNC. The I/O module in the serving RNC, upon receiving the packet, reads the UATI value to determine the server module that serves this session. It then passes the MAC Layer packet along with the Stream Identifier to that server module for further processing.

When a server module in the serving RNC has a MAC Layer packet ready for transmission on a forward traffic channel, it first sends it to the I/O card in the serving RNC along with a Stream Identifier that includes the transmitting sector's SectorID (or a representation of it), the UATI of the receiving AT and a MAC Index identifying the connection. The I/O card in the serving RNC then uses the UATI value to look up the IP address of the RN to which to send the packet. It encapsulates the MAC Layer packet together with a Stream Identifier in an IP packet whose destination address is set to the IP Address of the RN. The RN, upon receiving the packet, reads the SectorID value in the Stream Identifier to determine the sector that will transmit the packet. It then passes the MAC Layer packet along with the Stream Identifier to the appropriate modem card, which schedules the MAC Layer packet for transmission on the Forward Link using the MAC Index as the preamble.

Similarly, on the forward link, when a server module in the serving RNC has a MAC Layer packet ready for transmission on the Control Channel of a particular sector, it first sends the packet to an I/O card in the serving RNC along with a Stream Identifier that includes the UATI of the receiving AT, the transmitting sector's SectorID (or a representation of it) and a MAC Index identifying the packet as a control channel packet. The I/O card in the serving RNC then uses the UATI value to determine the IP address of the RN to which to send the packet. It then encapsulates the MAC Layer packet together with its Stream Identifier in an IP packet whose destination address is set to the IP Address of the RN. The RN, upon receiving the packet, reads the SectorID value in the Stream Identifier to determine the sector that will transmit the packet. It then passes the MAC Layer packet along with the SectorID and MAC Index to the appropriate modem card. The modem card schedules the packet for transmission on the control channel.

Failure Recovery & Load Balancing

The client/server architecture described earlier can be further extended to increase the overall reliability of the wireless network. (Note, the RNC may be a carrier-class equipment with internal redundancy to handle failure of its various cards/ modules. The situation we consider here is one where the equipment either does not have redundancy for every card/module or where the redundant component also fails.)

Failure Recovery Without Session Preservation

First, consider an approach where each RN, upon power-up, first communicates with a primary RNC Resource Control Agent who may reside in one or more of the RNC's. The primary Resource Control Agent assigns each RN to a Default RNC. The RN then routes all new session requests to that Default RNC.

When an RNC becomes completely unreachable due to some failure, all AT's that are being served by that RNC will ultimately recognize that their IS-856 sessions have been lost. Each of these AT's will initiate a new session by sending a UATI_Request over the Access Channel. Every RN who receives one of these requests will route them to its default RNC. If at any time, the RN cannot reach its default RNC, it will immediately request a new default RNC from the primary RNC Resource Control Agent. If the primary RNC Resource Control Agent is also not reachable, it will send a similar request to a secondary RNC Resource Control Agent. Once the UATI_Request is received by the Default RNC, it will immediately establish a new IS-856 session with the AT and will further initiate the procedure to set up a new A10 connection with a PDSN.

Assignment of a new Default RNC may also be initiated by the RNC Resource Control Agent. This can be accomplished by having the RNC Resource Control Agent continuously monitor the health of all the RNC's in the subnetwork. Upon detecting the failure of an RNC, the RNC Resource Control Agent immediately communicates with all affected RN's and assigns them to new Default RNC's. In assigning RN's to Default RNC's, the RNC Resource Control Agent may perform load balancing to ensure that user sessions are evenly distributed across all available RNC's.

Load Balancing Session Assignment

The above method can be further enhanced by making the RNC Resource Control Agent ultimately responsible for assigning user sessions to RNC's. In this case, when a Default RNC or possibly the RN itself receives a new UATI_Request, it asks the RNC Resource Control Agent to assign the session to an RNC. The RNC Resource Control Agent assigns the session to an RNC based on resource availability, loading and the distance between the RNC and the RN presently serving the AT. This approach provides better load balancing among RNC's, allowing user sessions to be distributed across RNC's more dynamically, while also taking into account the current position of the AT. In case of an RNC failure, all new session requests will arrive at the RNC Resource Control Agent who will then assign these sessions to new RNC's, again based on loading and other considerations.

The RNC Resource Control Agent may also be used to trigger dormant handoffs for load balancing or other purposes. In Phase 1 IS-856 networks, a dormant inter-RNC handoff is always triggered by the AT upon detection of a subnet change. As we discussed earlier, lack of an immediate dormant handoff may result in lost paging data.

In the improved IS-856 networks shown in FIGS. 3 and 4, a dormant handoff can be initiated by the network based on the location of the AT. Upon receipt of a RouteUpdate, when a serving RNC determines that a transfer of a user session to another RNC is desired (for load balacing or other reasons), it sends a Dormant Handoff request to the RNC Resource Control Agent who assigns the session to a new RNC. The new serving RNC then assigns a new UATI and performs a session transfer from the previous serving RNC.

In a more distributed implementation of the RNC Resource Control Agent concept, RNC's can constantly communicate with the RN's and other RNC's to provide routing information (including their loading) to all the RN's, thereby allowing the RN's to route incoming session requests to the correct RNC without going through a RNC Resource Control Agent. A drawback of this approach is that significant backhaul signaling traffic would be created as a result of exchanging such dynamic loading information.

Failure Recovery with Session Preservation

In some networks, it may be necessary to recover user session information in case of an RNC failure. This would eliminate the air link congestion that hundreds of new session requests could create shortly after an RNC failure. In order to preserve sessions in case of failure of an RNC, a copy of such information (for all sessions in the subnetwork) can be stored in the RNC Resource Control Agent.

When an RNC fails and the AT initiates a new session, its new session request will reach the RNC Resource Control Agent. The RNC Resource Control Agent then not only assigns a new serving RNC to each session, but also provides the session information thereby avoiding lengthy session establishment procedures. Once a new UATI is successfully assigned to the AT, communication with the network may resume. The RNC Resource Control Agent further provides information related to the A10 interface, in order to allow the RNC establish an A10 session with the same PDSN, thereby avoiding the setting up of new PPP and Mobile/Simple IP sessions.

A similar recovery procedure can be applied within the RNC, by setting up an RNC Resource Control Agent inside the RNC. The RNC Resource Control Agent may then run on a specific redundant card, with a hot standby. The RNC Resource Control Agent is then responsible for allocating sessions to server modules. In case a server module fails, the session is internally reallocated to another server module. In principle, the operation of this system is the same as the one operating across the network. Moreover, in this case, it is not necessary to reestablish the A10 session to the PDSN, since the external IP address of the PCF seen by the PDSN can be maintained.

Integrated RNC & PDSN

Another benefit of the client-server architecture described above is the ability to combine the RNC and PDSN functions in a single network element. In hierarchical 3G packet data networks, a PDSN represents the highest point in the hierarchy, and therefore can support multiple RNC's. A new generation of PDSN's are expected to supports hundreds of thousands of users, and several RNC's.

In existing radio access networks with dedicated point-to-point links between RN's and RNC's, migrating the PDSN function to the RNC would be undesirable, because this would reduce the number of sessions that could be supported, resulting in frequent costly handoffs between PDSN's that involve new PPP and Simple/Mobile IP registrations.

In the client/server architecture described here handoffs between RNC's occur much less frequently therefore allowing the integration of the PDSN function into the RNC. Such an approach also simplifies the networking between the RNC and the PDSN, and further increases scalability and reliability.

In an RNC with an integrated PDSN, so-called PDSN server modules are added to handle the PDSN function. This includes PPP termination, Simple IP and/or Mobile IP foreign agent and the AAA client functions. As long as the AT remains within a subnet (say an RNC cluster), no inter-PDSN handoffs would be required.

If an integrated RNC/PDSN fails, all sessions supporting an AT (including the air interface, PPP and Simple/MobileIP sessions) are transferred to another RNC/PDSN thereby avoiding any new session establishment between the AT and the wireless network.

Other embodiments are within the scope of the following claims.

The invention claimed is:

1. A method comprising:
enabling many-to-many communication among radio network controllers and radio nodes through a packet network,
establishing a first session for a first access terminal on a first radio network controller through a first radio node, and
maintaining the first session on the first radio network controller when the first access terminal is dormant and moves from a coverage area of the first radio node to any portion of a coverage area of a second radio node through which a second access terminal has a second session on a second radio network controller without transferring the first session to the second radio network controller;
wherein when the first access terminal is dormant, the first access terminal has the first session established on the first radio network controller and does not have any traffic channel established with any radio network controller; and
wherein when the second access terminal is dormant, the second access terminal has the second session established on the second radio network controller and does not have any traffic channel established with any radio network controller.

2. The method of claim 1, wherein the first radio network controller comprises a default controller for the first radio node, the method further comprising:
routing, by the first radio node, data packets received from a third access terminal that does not have an existing session to the first radio network controller.

3. The method of claim 1, wherein the first radio node sends reverse link traffic channel packets to more than one radio network controller.

4. The method of claim 1, wherein traffic channel radio resources are managed in the first radio node and the second radio node, and the first radio network controller requests radio resources from the first radio node before adding any sectors associated with the first radio network controller to any traffic channel.

5. The method of claim 1, wherein the first radio network controller and second radio network controllers reside in different locations and are connected by a metropolitan-area network.

6. The method of claim 1, wherein the first session is transferred from the first radio network controller in one subnetwork to another radio network controller in another subnetwork based upon a predetermined criterion.

7. The method of claim 6, wherein the predetermined criterion is the detection of a subnetwork change.

8. The method of claim 6, wherein the session transfer is triggered by a radio network controller.

9. A method performed by a radio node, the method comprising:
receiving routing information for a first session between a dormant first access terminal and a first radio node controller, the first session having been maintained by a first radio node;
receiving a notification that the dormant first access terminal has moved into a coverage area of the radio node; and
while maintaining a second session between a dormant second access terminal and a second radio node controller, maintaining the first session between the dormant first access terminal and the first radio node controller;
wherein the dormant first access terminal does not have any traffic channel established with any radio network controller; and
wherein the dormant second access terminal does not have any traffic channel established with any radio network controller.

10. The method of claim 9, wherein the second radio network controller comprises a default controller for the radio node, and
wherein the method further comprising routing data packets received from a third access terminal that does not have an existing session to the second radio network controller.

11. The method of claim 10, wherein the radio node sends reverse link traffic channel packets to more than one radio network controller.

12. The method of claim 9, further comprising managing traffic channel radio resources, and
requesting radio resources from the first radio node before adding any of the radio node's sectors to any traffic channel.

13. The method of claim 9, wherein the first radio network controller and second radio network controllers reside in different locations and are connected by a metropolitan-area network.

14. A system comprising:
a radio node in a mobile wireless network, the radio node configured to:
receive routing information for a first session between a dormant first access terminal and a first radio node controller, the first session having been maintained by a first radio node;
receive a notification that the dormant first access terminal has moved into a coverage area of the radio node; and
while maintaining a second session between a dormant second access terminal and a second radio node controller, maintain the first session between the dormant first access terminal and the first radio node controller;
wherein the dormant first access terminal does not have any traffic channel established with any radio network controller; and
wherein the dormant second access terminal does not have any traffic channel established with any radio network controller.

15. The system of claim 14, wherein the second radio network controller comprises a default controller for the radio node, the radio node further configured to:
routing data packets received from a third access terminal that does not have an existing session to the second radio network controller.

16. The system of claim 15, wherein the radio node sends reverse link traffic channel packets to more than one radio network controller.

17. The system of claim 15, the radio node further configured to:
manage traffic channel radio resources, and
request radio resources from the first radio node before adding any of the first radio node's sectors to any traffic channel.

18. The system of claim 14, wherein the first radio network controller and second radio network controllers reside in different locations and are connected by a metropolitan-area network.

* * * * *